United States Patent
Park et al.

(10) Patent No.: US 8,902,345 B2
(45) Date of Patent: Dec. 2, 2014

(54) METHOD AND APPARATUS FOR SYNTHESIZING TWO OR MORE IMAGES TOGETHER WITH ONE ANOTHER VIA DIVIDED DISPLAY SCREEN

(75) Inventors: Wan-je Park, Seongnam-si (KR); Hye-jin Kim, Seoul (KR); Tai-hoon Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 62 days.

(21) Appl. No.: 13/603,592

(22) Filed: Sep. 5, 2012

(65) Prior Publication Data
US 2013/0162878 A1    Jun. 27, 2013

(30) Foreign Application Priority Data
Dec. 23, 2011    (KR) .......................... 10-2011-0141731

(51) Int. Cl.
*H04N 5/222*    (2006.01)

(52) U.S. Cl.
USPC ................................................... 348/333.05

(58) Field of Classification Search
USPC ............ 348/333.02–333.06, 218.1, 239, 241, 348/246, 208.4
See application file for complete search history.

(56) References Cited

U.S. PATENT DOCUMENTS

| | | | | |
|---|---|---|---|---|
| 2003/0174217 | A1* | 9/2003 | Kito et al. | 348/231.2 |
| 2009/0303354 | A1* | 12/2009 | Yanagi | 348/240.1 |
| 2012/0075496 | A1* | 3/2012 | Akifusa et al. | 348/222.1 |
| 2012/0163659 | A1* | 6/2012 | Asakura et al. | 382/103 |

FOREIGN PATENT DOCUMENTS

| | | | |
|---|---|---|---|
| KR | 10-2005-0116699 A | | 12/2005 |
| KR | 10-1050662 B1 | | 7/2011 |

* cited by examiner

*Primary Examiner* — Mekonnen Dagnew
(74) *Attorney, Agent, or Firm* — Drinker Biddle & Reath LLP

(57) ABSTRACT

A digital photographing apparatus and a method of controlling the same. The method including setting a division frame configured by dividing a display screen; displaying a first input image in a first region of the set division frame; displaying the first input image captured according to a first photographing signal, in the first region; displaying a second input image in a second region of the set division frame; and displaying the second input image captured according to a second photographing signal in the second region.

18 Claims, 17 Drawing Sheets

METHOD AND APPARATUS FOR SYNTHESIZING TWO OR MORE IMAGES TOGETHER WITH ONE ANOTHER VIA DIVIDED DISPLAY SCREEN

CROSS-REFERENCE TO RELATED PATENT APPLICATIONS

This application claims the benefit of Korean Patent Application No. 10-2011-0141731, filed on Dec. 23, 2011, in the Korean Intellectual Property Office, the entire disclosure of which is incorporated herein by reference.

BACKGROUND

1. Field of the Invention

One or more embodiments of the invention relate to a digital photographing apparatus and a method of controlling the same that enables synthesizing images together.

2. Description of the Related Art

Synthesized image are often pleasing to a user of a digital camera. For example, some digital cameras enable a user to synthesize an image of a face with a background image of a famous location. However, many current digital cameras (and more generally digital photographing apparatuses) do not provide users a convenient way to synthesize two or more images together with one another.

SUMMARY

Therefore, there is a need in the art for a digital photographing apparatus and method of controlling the same, the method including: setting a division frame configured by dividing a display screen; displaying a first input image in a first region of the set division frame; displaying the first input image captured according to a first photographing signal, in the first region; displaying a second input image in a second region of the set division frame; and displaying the second input image captured according to a second photographing signal, in the second region.

The method may further include synthesizing the first captured input image and the second captured input image with each other and displaying the synthesized image.

The method may further include storing the synthesized image obtained by synthesizing the first captured input image and the second captured input image, as one image file.

The method may further include providing a frame selection menu for selecting one from among a plurality of division frames.

The method may further include adjusting a size of the set division frame.

The method may further include blur processing a boundary region of the set division frame.

The method may further include: providing a selection menu for blur processing a boundary region of the set division frame; displaying sample images in the first region and the second region, respectively, according to selection of the blur processing; blur processing the boundary region based on the displayed sample images; and blur processing a boundary region between the first displayed input image or the second displayed input image.

The method may further include determining an intensity of the blur processing.

The method may further include displaying a selection menu including a plurality of image processing effects on the first displayed input image and the second displayed input image.

The first input image or the second input image to which an image processing effect selected using the selection menu is applied, may be displayed.

The method may further include: providing a frame selection menu for selecting one from among a plurality of division frames; and displaying a sample image that is synthesized using the division frame selected using the frame selection menu.

Information regarding the synthesized sample image may be displayed together with the synthesized sample image.

According to another aspect of the invention, there is provided a method of controlling a digital photographing apparatus, the method including: providing a frame selection menu including a plurality of division frames; dividing a display screen based on a division frame selected from among the plurality of division frames; displaying a first input image in a first region of the division frame and capturing the first input image according to a first photographing signal; displaying the first captured input image in the first region; displaying a second image in a second of the division frame and capturing the second input image according to a second photographing signal; displaying the second captured input image in the second region; and storing a synthesized image obtained by synthesizing the first captured input image and the second captured input image.

According to another aspect of the invention, there is provided a digital photographing apparatus including: a division frame setting unit for setting a division frame configured by dividing a display screen; a photographing control unit for controlling photographing of an input image according to a photographing signal; and a display control unit displaying the input image and an image obtained by capturing the input image on the display screen, wherein the display control unit displays a first input image in a first region of the set division frame, displays the first input image captured according to a first photographing signal in the first region, displays a second input image in a second region of the set division frame, and displays the second input image captured according to a second photographing signal in the second region.

The digital photographing apparatus may further include an image synthesizing unit for synthesizing the first captured input image and the second captured input image, wherein the display control unit displays the synthesized image.

The division frame setting unit may provide a frame selection menu for selecting one from among a plurality of division frames.

The division frame setting unit may adjust a size of the set division frame.

The digital photographing apparatus may further include a blur processing unit
for blur processing a boundary region of the set division frame.

The digital photographing apparatus may further include a storage control unit for storing the synthesized image obtained by synthesizing the first captured input image and the second captured input image, as one image file.

The digital photographing apparatus may further include an effect applying unit for applying an image processing effect selected using the selection menu including a plurality of image processing effects on the first displayed input image or the second displayed input image, wherein the display control unit displays the first input image or the second input image to which the image processing effect selected using the selection menu.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
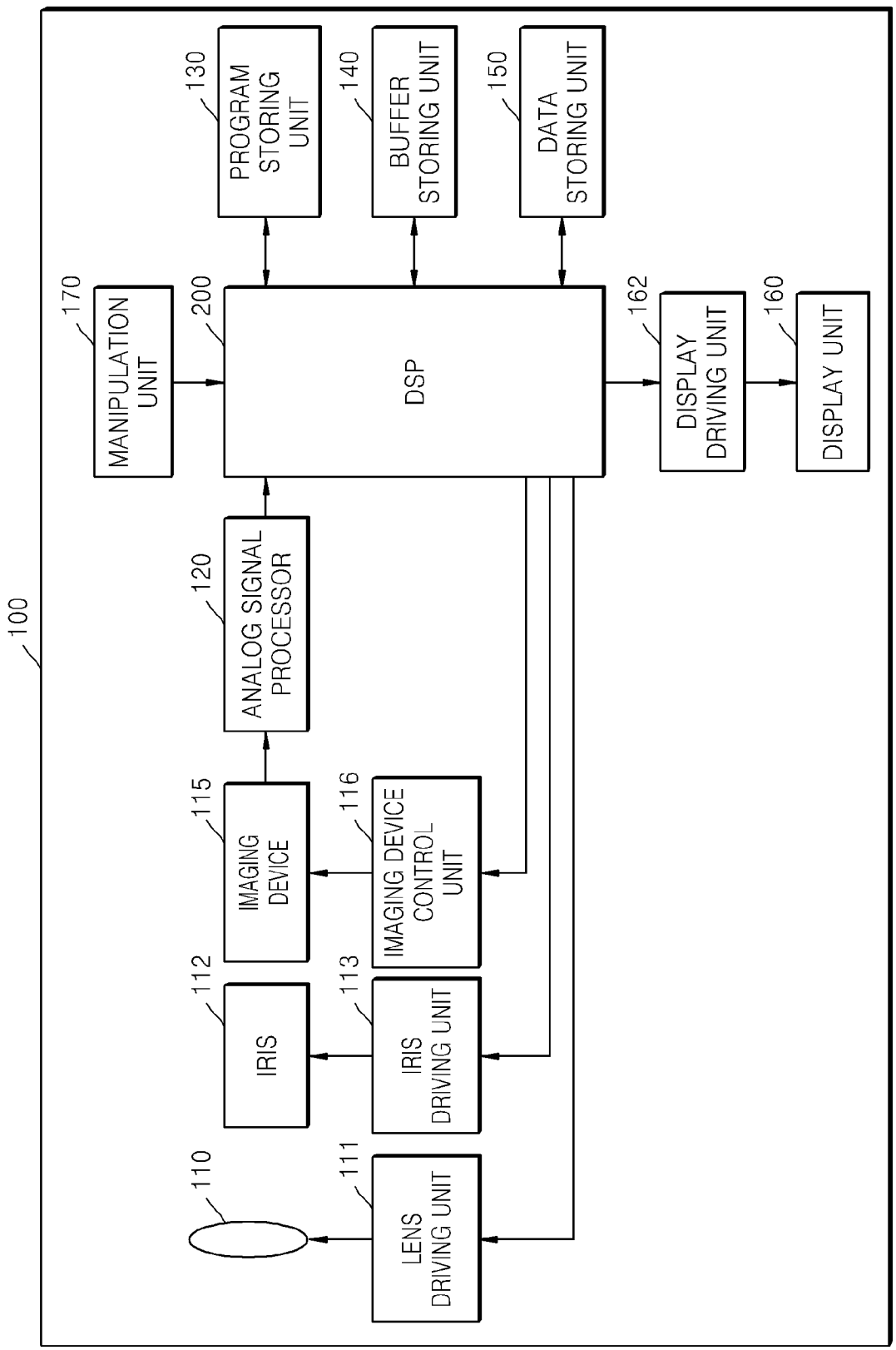
FIG. 1 is a diagram schematically illustrating a structure of a digital camera as an example of a digital photographing apparatus according to an embodiment of the invention.

The invention will be described below in more detail with reference to the accompanying drawings, in which exemplary embodiments of the invention are shown. Those components that are the same or are in correspondence are rendered the same reference numeral regardless of the figure number, and redundant explanations are omitted.

FIG. 1 is a diagram schematically illustrating the structure of a digital photographing apparatus according to an embodiment of the invention. A digital camera 100 is described as an example of the digital photographing apparatus according to an embodiment of the invention. However, the digital photographing apparatus is not limited to the digital camera 100 illustrated in FIG. 1, and may also be applied to other digital devices. Examples of other digital devices include a smart phone including a camera module, a mobile phone, a personal digital assistant (PDA), a portable multimedia player (PMP), and a camcorder.

The digital camera 100 according to the current embodiment may include a lens unit 110, a lens driving unit 111, an iris 112, an iris driving unit 113, an imaging device 115, an imaging device control unit 116, an analog signal processor 120, a program storing unit 130, a buffer storing unit 140, a data storing unit 150, a display driving unit 162, a display unit 160, a digital signal processor (DSP) 200, and a manipulating unit 170. Herein, the lens unit 110, the lens driving unit 111, the iris 112, the iris driving unit 113, the imaging device 115, the imaging device control unit 116, and the analog signal processor 120 may be collectively referred to as a photographing unit.

The lens unit 110 collects a light signal. The lens unit 110 includes a zoom lens for reducing or increasing a viewing angle according to a focal length and a focus lens for adjusting the focus on a subject, and each of the zoom lens and the focus lens may be a single lens or a group of a plurality of lenses. The iris 112 regulates the light intensity of an incident light by controlling the amount of opening/closing thereof.

The lens driving unit 111 and the iris driving unit 113 are provided with a control signal from the DSP 200 to drive the lens unit 110 and the iris 112. The lens driving unit 111 controls the position of a lens to adjust a focal length, and performs auto focusing, zooming, focusing operations, and so forth. The iris driving unit 113 controls the amount of opening/closing of the iris 112, and in particular, adjusts an f number or an iris value to perform auto focusing, auto exposure correction, focusing, depth-of-field (DOF) adjusting operations, and the like.

The light signal passing through the lens unit 110 forms an image of a subject on a light-receiving surface of the imaging device 115. The imaging device 115 may be a charge-coupled device (CCD), a complementary metal-oxide semiconductor image sensor (CIS), or a high-speed image sensor which converts the light signal into an electric signal. The sensitivity of the imaging device 115 may be controlled by the imaging device control unit 116. The imaging device control unit 116 may control the imaging device 115 according to a control signal, which is automatically generated by an image signal input in real time or manually input by the user's manipulation. The exposure time of the imaging device 115 is controlled by a shutter (not shown). The shutter may be a mechanical shutter for adjusting incidence of light by moving a shade or an electronic shutter for controlling exposure by supplying an electric signal.

The analog signal processor 120 performs noise reduction processing, gain control, waveform standardization, analog-digital conversion, and the like with respect to the analog signal provided from the imaging device 115.

Through the manipulating unit 170, a control signal can be externally input, for example, from a user. The manipulating unit 170 includes a shutter-release button for inputting a shutter-release signal which exposes the imaging device 115 to light for a predetermined time to photograph the subject, a moving image recording button for inputting a moving image recording start signal and a moving image recording end signal to photograph a moving image, a power button for inputting a control signal for controlling power-on/off, a wide-angle zoom button and a telephoto zoom button for increasing or reducing the angle of view, respectively, and other function buttons for mode selection from a text input mode, a photographing mode, a play mode, and the like, a white balance setting function, an exposure setting function, and so forth. The manipulating unit 170 may be implemented with, without being limited to, various buttons as described above, but may also be implemented in any form of user input, such as a keyboard, a touch pad, a touch screen, a remote control, or the like.

The digital camera 100 may include the program storing unit 130 for storing programs of an operating system and an application system of digital camera 100, the buffer storing unit 140 for temporarily storing data required during an operation or storing result data, and the data storing unit 150 for storing data required for programs, such as an image file corresponding to an image signal and a moving image file.

The digital camera 100 also includes the display unit 160 for displaying an operational state of the digital camera 100 or still image data or moving image data obtained by the digital camera 100. The display unit 160 may provide visual information and/or audible information to the user. To provide visual information, the display unit 160 may include, for example, a liquid crystal display (LCD) or an organic light emitting diode (OLED) display. The display driving unit 162 provides a drive signal to the display unit 160. In some embodiments of the invention, the display unit 160 may be disposed at a rear side of the display camera 100, i.e., on a plane on which manipulation panels are disposed. In addition, the display unit 160 may be disposed at a front side of the digital camera 100 to face the subject, or may be disposed at the rear side of the digital camera 100 in a default state and then may be flipped upwards to face the subject. Also, the display unit 160 may be implemented with a dual LCD and thus may be disposed at the rear and front sides of the digital camera 100, respectively.

The digital camera 100 also includes the DSP 200 for processing an input image signal and controlling components of the digital camera 100 according to the input image signal or an externally input signal. The DSP 200 may perform image signal processing for quality improvement, such as noise reduction, gamma correction, color filter array interpolation, color matrix, color correction, and color enhancement, with respect to input image data. The DSP 200 also may compress the image data generated by performing image signal processing for quality improvement to generate an image file, or may restore the image data from the image file. An image compression format may be a reversible format or an irreversible format. The compressed data may be stored in the data storing unit 150. The DSP 200 may also functionally perform indistinctness processing, color processing, blur processing, edge emphasis processing, image interpretation processing, image recognition processing, image effect processing, and the like. The image recognition processing may include face recognition and scene recognition. For example, luminance level adjustment, color correction, contrast adjustment, contour emphasis adjustment, screen dividing processing, image generation and synthesis processing, and the like may be performed by the DSP 200 for image and face recognition.

The DSP 200 may execute a program stored in the program storing unit 130 or include a separate module to generate a control signal for controlling auto focusing, zooming, focus changing, and auto exposure correction operations, provide the control signal to the lens driving unit 111, the iris driving unit 113, and the imaging device control unit 116, and collectively control operations of components included in the digital camera 100, such as a shutter, a flash, and the like.

In some embodiments of the invention, the DSP 200 may provide a division frame configured by dividing a screen of the display unit 160. The DSP 200 may display an image captured by performing a photographing operation on a live view image displayed in a first region of the division frame. The DSP 200 may display an image captured by performing a photographing operation on a live view image displayed in a second region of the division frame. The DSP 200 may synthesize the images, which are captured in the first and second regions of the division frame, to store the synthesized images as one image file.

In some embodiments of the invention, the DSP 200 may provide a blur processing effect in a boundary region of the division frame. The DSP 200 may provide a sample image to predict a blur effect in advance. The DSP 200 may store a plurality of images captured using the division frame by applying various image processing effects, together with various effects.

Figure 2:
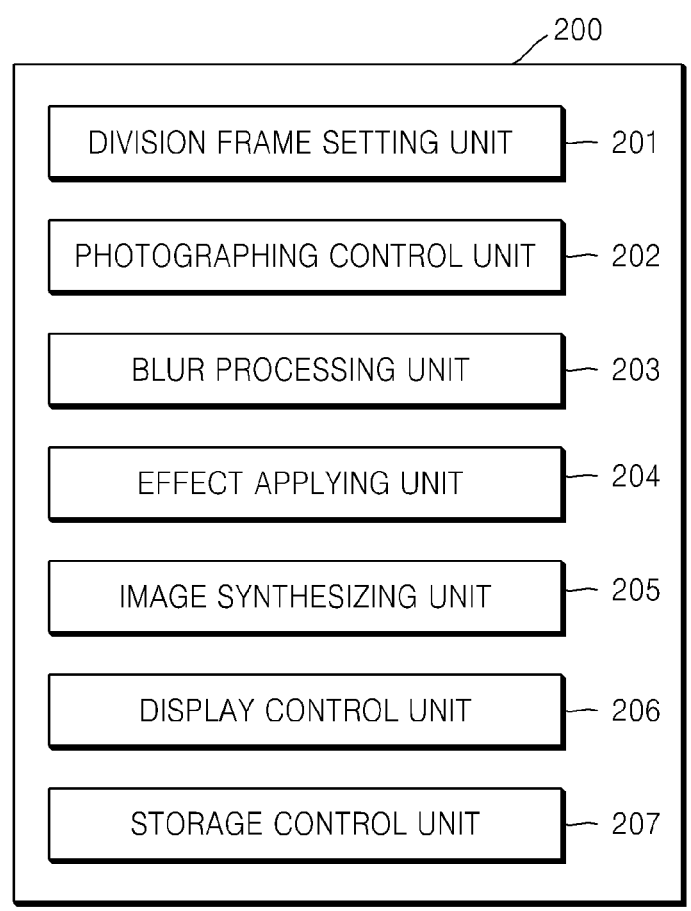
FIG. 2 is a detailed block diagram of an example of a digital signal processor illustrated in FIG. 1.

FIG. 2 is a detailed block diagram of an example of the DSP 200 shown in FIG. 1. Referring to FIG. 2, the DSP 200 may include a division frame setting unit 201, a photographing control unit 202, a blur processing unit 203, an effect applying unit 204, an image synthesizing unit 205, a display control unit 206, and a storage control unit 207.

The division frame setting unit 201 may set a division frame configured by dividing a display screen. In some embodiments, the display screen refers to the entire screen of the display unit 160. The division frame may include horizontal-2-division, horizontal-3-division, vertical-2-division, or vertical-3-division. Although it is described that the display screen is divided in a horizontal or vertical direction, the invention is not limited thereto, and a variety of types of division may be possible. For example, the display screen may be divided diagonally or in a shape that accommodates subject shapes within images. In addition, the division frame setting unit 201 may provide a frame selection menu including a plurality of division frames having various shapes, for example, horizontal-2-division, horizontal-3-division, vertical-2-division, or vertical-3-division, and may divide the display screen based on one division frame selected by the user. In addition, the division frame setting unit 201 may provide an interface for adjusting the size of a frame according to user's selection, for example, by touching the boundary region of the division frame, and may provide the division frame having the adjusted size according to user's election, for example, by dragging a boundary line. Although it is described that the size of the division frame is adjusted according to a user's touching and dragging operation, embodiments of the invention are not limited thereto, and the size of the division frame may also be adjusted using other interfaces, for example, using manipulation keys.

The photographing control unit 202 may control photographing of an input image according to a photographing signal. The photographing control unit 202 may control photographing of the input image according to a shutter-release signal generated when a shutter-release button disposed on the manipulating unit 170 is pressed. Photographing control may be performed according to a general photographing control process. For example, when a first shutter-release signal of a half shutter or shutter-release signal is input from an input image or a live view image, a focus value may be obtained by performing focusing in a focus region, and focus control for moving a focus lens based on the focus value may be performed, and an appropriate exposure value may be controlled according to the light intensity of incident light, and exposure control for controlling an iris value and a shutter speed may be performed. Then, when a second shutter-release signal of a full shutter or shutter-release signal is input, the input image may be captured.

The blur processing unit 203 performs blur processing in a particular region of the input image, or a sample image. Blur processing refers to image processing for making an image smooth by removing detailed parts of an arbitrary image. Blur processing or blurring may be performed using a filter for averaging values of pixels, for example, a low pass filter or a Gaussian blur filter. Although it is described that blur processing is performed using an average filter, a low pass filter, or a Gaussian blur filter, the invention is not limited thereto, and other various blur processing methods may also be used. In some embodiments of the invention, the blur processing unit 203 may perform blur processing in the boundary region of the division frame to prevent the boundary region from appearing artificial when captured images are synthesized at each division frame. In addition, the blur processing unit 203 may perform blur processing on the sample image. Here, the sample image is a previously-captured image or a stored image. The blur processing unit 203 may provide an intensity selection menu of blur processing to the user. The blur processing unit 203 may process the sample image based on the selected blur processing intensity. The blur processing unit 203 may inform the user of a blur processing effect of the input image in advance. The blur processing unit 203 may perform blur process on the input image based on the selected intensity. The effect applying unit 204 applies various image processing effects to the input image. In addition, the effect applying unit 204 may provide an effect selection menu for selecting various image processing effects and may apply the selected effect to the input image.

The image synthesizing unit 205 may synthesize images, which are captured from each divided image of the division frame, as one image. For example, the image synthesizing unit 205 may synthesize the images, which are captured from each divided image by using a horizontal-2-division frame, as one image.

The display control unit 206 may display an image input by the imaging device 115 or an image obtained after image processing is performed on the image input by the imaging device 115, on the display unit 160, or may display an image captured according to the shutter-release signal or an image obtained after image processing is performed on the image captured according to the shutter-release signal.

The storage control unit 207 may store an image synthesized by the image synthesizing unit 205 in a memory card (not shown), as one image file.

In some embodiments of the invention, the display control unit 206 may display a first input image in a first region of a set division frame, may capture the first input image according to a photographing signal, and may display the first input image in the first region. The display control unit 206 may display an input image, i.e., a live view image, in the first region of the division frame. When a first shutter-release signal is input, the display control unit 206 may display a captured image obtained after the input image is captured by the photographing control unit 202, or a quick view image in the first region. The display control unit 206 may display another input image, i.e., another live view image, in a second region of the division frame. When a second shutter-release signal is input, the display control unit 206 may display another captured image obtained after another input image is captured by the photographing control unit 202, or another quick view image in the second region. Here, the captured image displayed in the first region and the captured image displayed in the second region may be images that are obtained after undergoing synthesis, or images before synthesis is performed. In addition, the photographing signal, i.e., a first photographing signal or a second photographing signal refers to a signal generated when a half shutter S1 and a full shutter S2, or the full shutter S2 is pressed.

Figure 3:
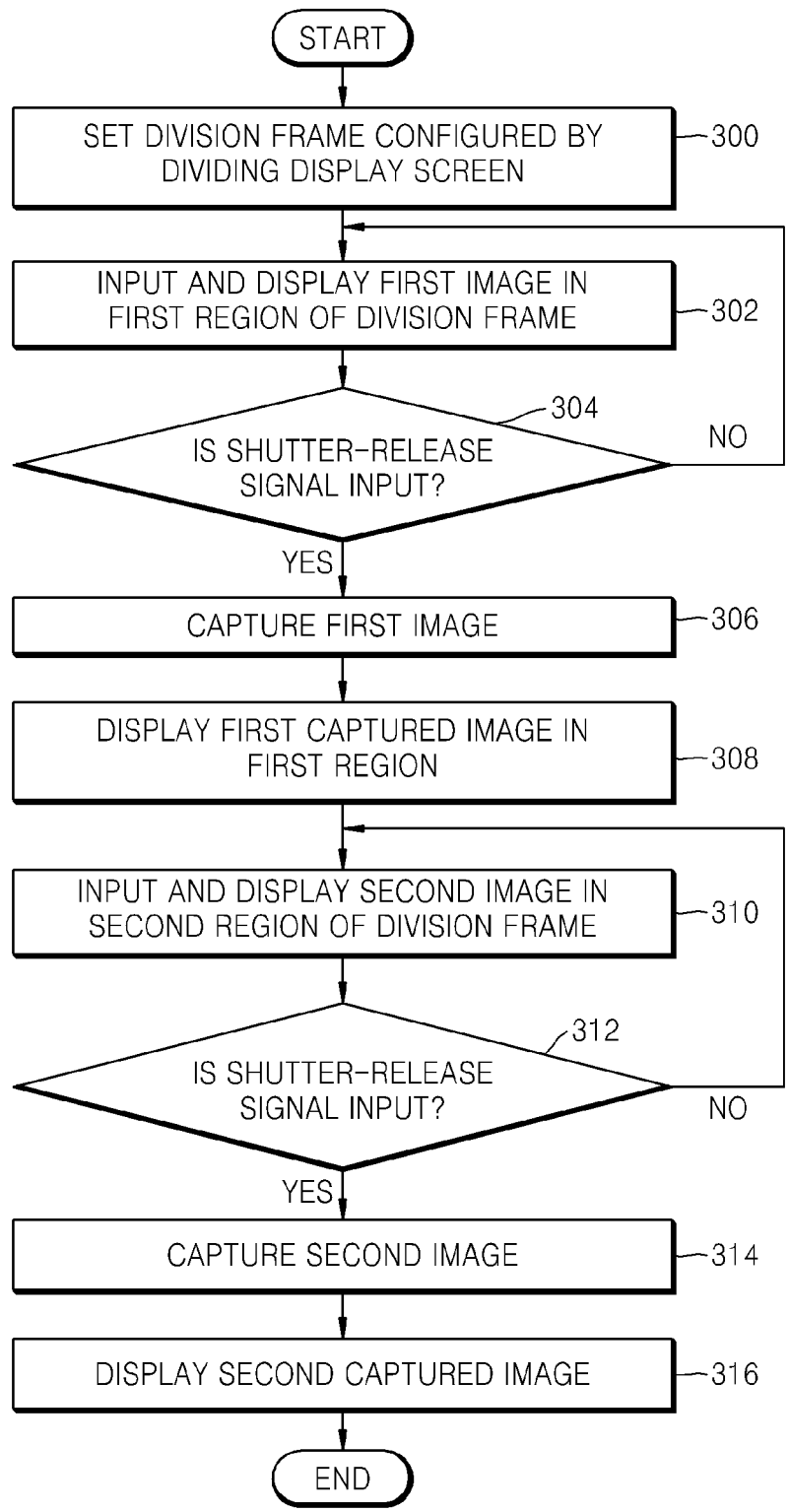
FIG. 3 is a flowchart illustrating an example of a method of controlling a digital photographing apparatus, according to an embodiment of the invention.

FIG. 3 is a flowchart illustrating an example of a method of controlling a digital photographing apparatus, according to an embodiment of the invention.

Referring to FIG. 3, in operation 300, the DSP 200 sets a division frame configured by dividing a display screen. In this embodiment, the division frame may include horizontal-2-division, horizontal-3-division, vertical-2-division, or vertical-3-division.

In operation 302, a first image is input and is displayed in a first region of the division frame. The first image is a live view image.

In operation 304, when a shutter-release signal is input, the method proceeds to operation 306 where the first image is captured. In operation 308, the first captured image is displayed in the first region. In some embodiments, the first captured image is a quick view image that is an image before being stored in the memory card (not shown).

In operation 310, a second image is input and is displayed in the second region of the division frame. Here, the second image is an image to be synthesized with the first captured image, which may be a live view image.

In operation 312, when the shutter-release signal is input, the method proceeds to operation 314 where the second image is captured. In operation 316, the second captured image is displayed. That is, the first captured image is displayed in the first region, and the second captured image is displayed in the second region. Here, before the second image is displayed, an image, which is obtained by synthesizing the second image with the first image that is captured before the second image, may also be displayed on the display screen.

Figure 4A:
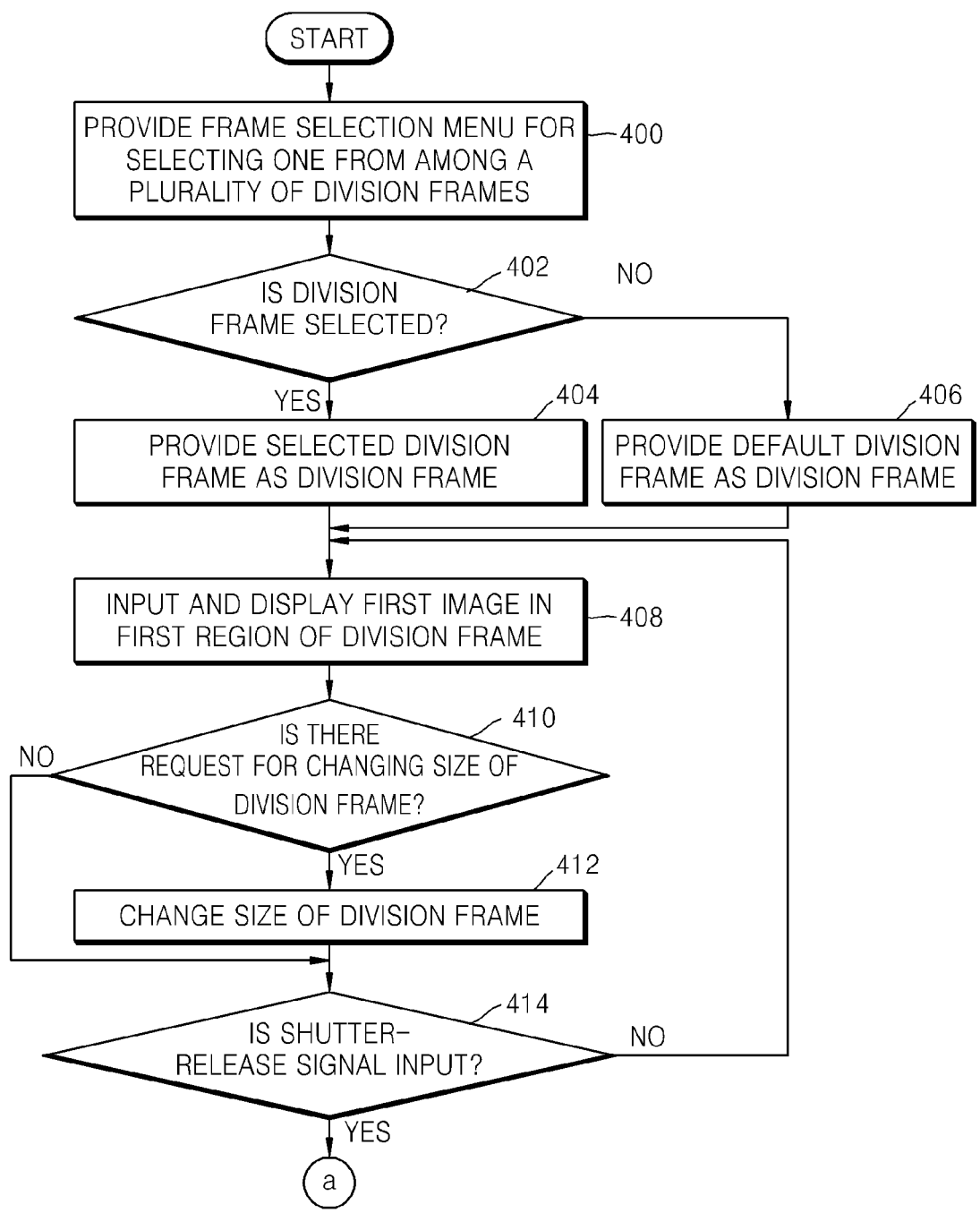
FIG. 4 is a flowchart illustrating an example of a method of controlling a digital photographing apparatus, according to another embodiment of the invention.
Figure 4B:
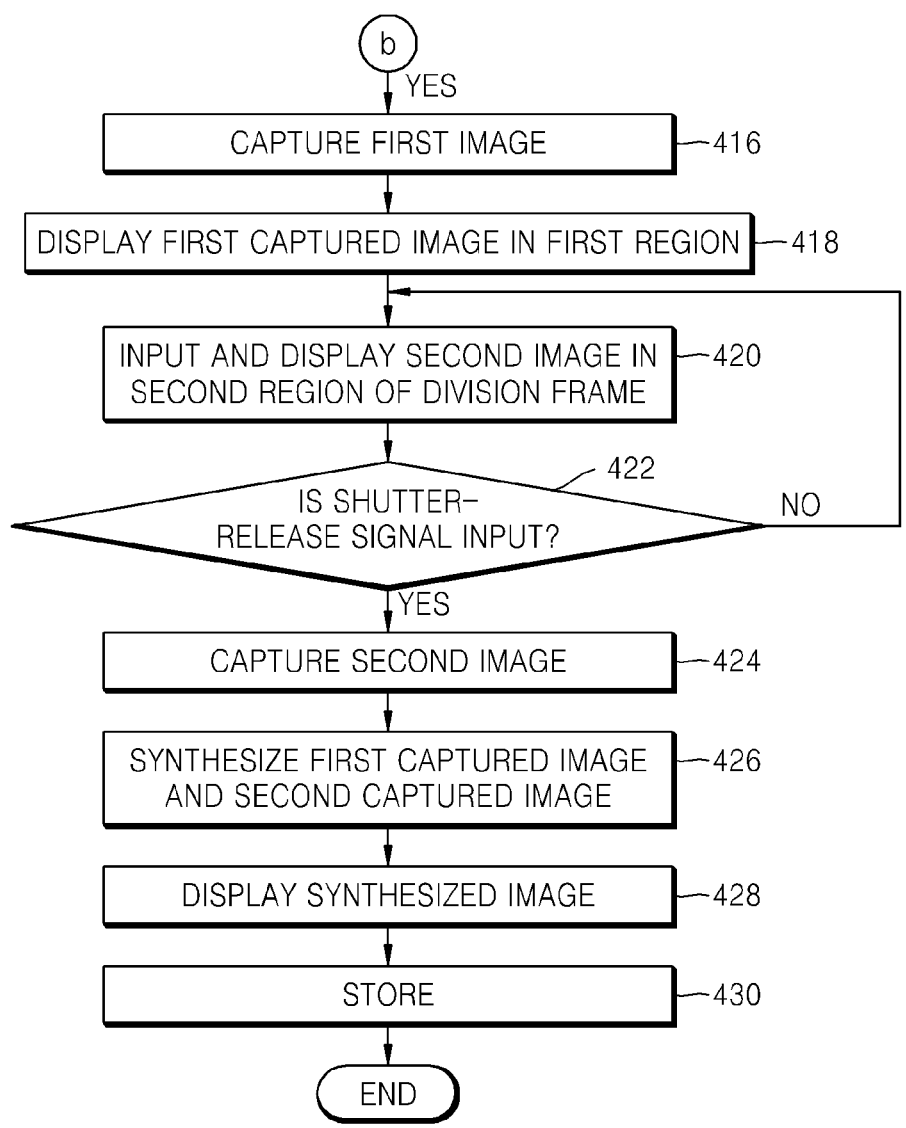

FIG. 4 is a flowchart illustrating an example of a method of controlling a digital photographing apparatus, according to another embodiment of the invention.

Referring to FIG. 4, in operation 400, a frame selection menu for selecting one from among a plurality of division frames is provided. In some embodiments, the frame selection menu may be a menu for selecting one from among horizontal-2-division, horizontal-3-division, vertical-2-division, and vertical-3-division and may be frames having various shapes and compositions.

In operation 402, when the division frame is selected, in operation 404, the selected division frame is provided as a division frame to a display screen.

In operation 402, when the division frame is not selected, in operation 406, a default division frame is provided as a division frame to the display screen.

In operation 408, the first image is input and is displayed in a first region of the division frame.

In operation 410, when there is a request for changing the size of the division frame, in operation 412, the size of the division frame is changed.

In operation 414, when the shutter-release signal is input, in operation 416, a first input image is captured. In operation 418, the first captured input image is displayed in the first region of the division frame.

In operation 420, a second image is input and is displayed in a second region of the division frame. In operation 422, when the shutter-release signal is input, in operation 424, the second image is captured.

In operation 426, the first captured image and the second captured image are synthesized.

In operation 428, the synthesized image is displayed.

In operation 430, the displayed, synthesized image is stored as one image file in a memory card (not shown).

FIGS. 5A through 5D are examples of views for explaining an example method of controlling a digital photographing apparatus, according to another embodiment of the invention.

Figure 5A:
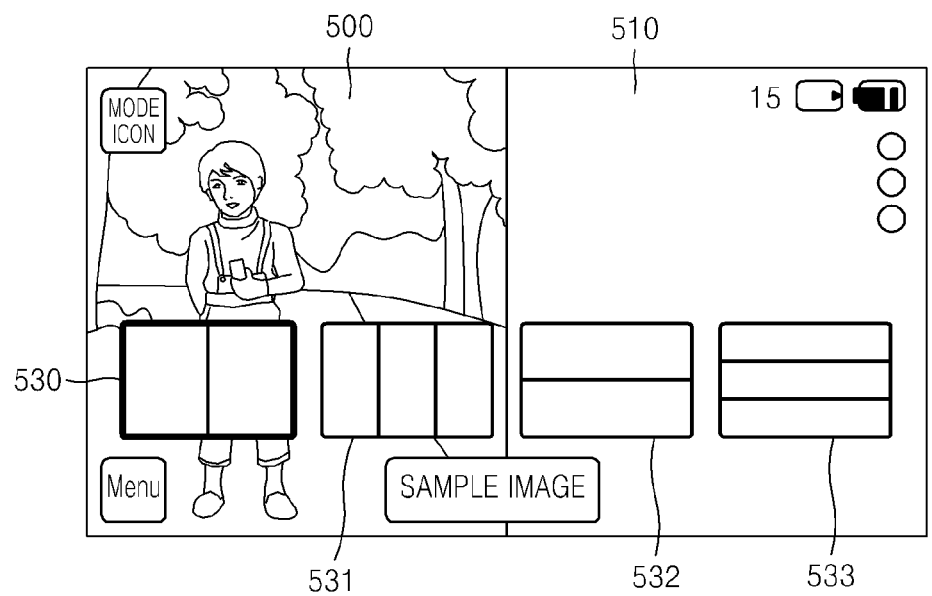
FIGS. 5A through 5D are example views for explaining a method of controlling a digital photographing apparatus, according to another embodiment of the invention.

Referring to FIG. 5A, a plurality of division frames 530 through 533 are displayed on a display screen, and a horizontal-2-division frame 530 is selected from among the plurality of division frames 530 through 533. The bolded lines of horizontal-2-division frame indicate that it is selected. If one is selected from among the plurality of division frames, a frame selection menu may disappear from the display screen. The display screen is divided based on the selected horizontal-2-division frame 530, and an input image 500 is displayed in a left region. Here, the input image 500 is a live view image. A right region 510 may be a black screen before photographing. A user may perform an image capturing operation while seeing the input image 500 displayed in the left region.

Figure 5B:
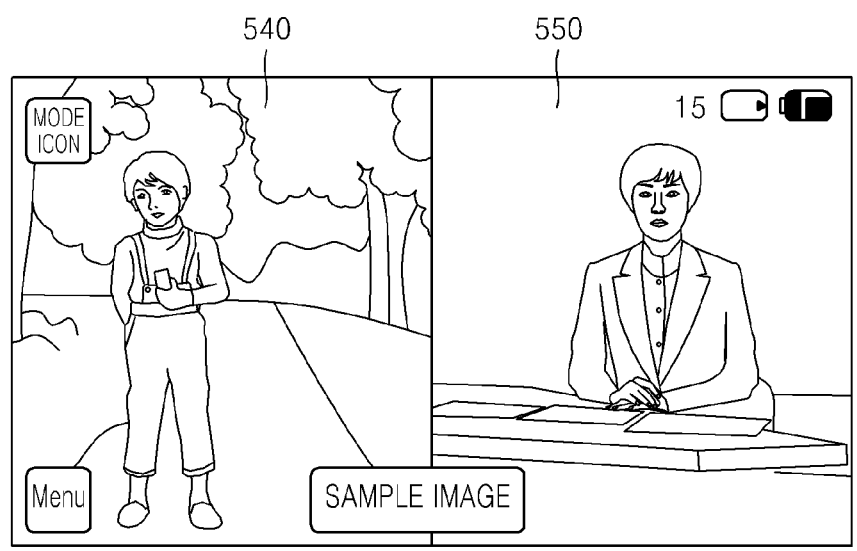

Referring to FIG. 5B, when a shutter-release button is pressed, a captured image 540 obtained by capturing the input image 500 is displayed in the left region. Here, the captured image 540 may be a quick view image before the captured image 540 is stored. An input image 550 to be captured next is displayed in a right region. Here, the input image 550 is a live view image to be captured so that the user synthesizes the input image 550 with the captured image 540 displayed in the left region. The user may perform an operation of capturing an image to be synthesized, while seeing the live view image 550 displayed in the right region.

Figure 5C:
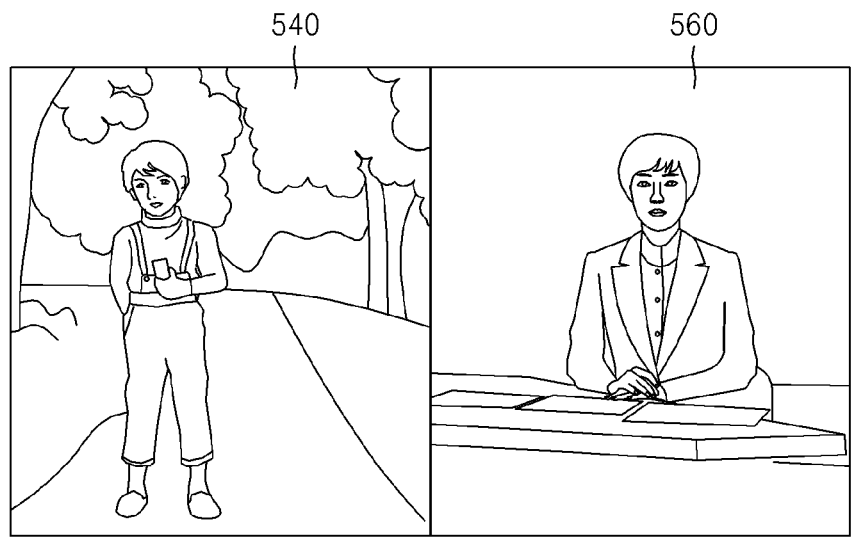
Figure 5D:
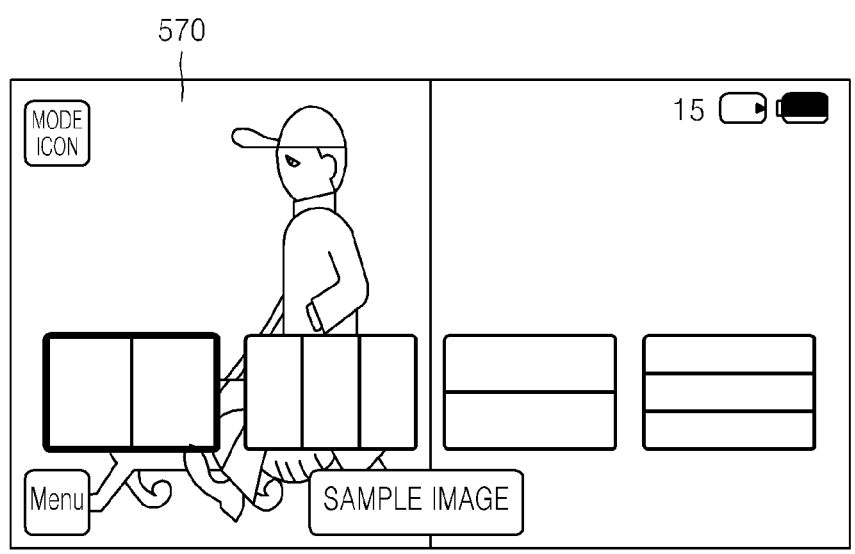

Referring to FIG. 5C, a captured image 560 obtained by capturing the live view image 550 is displayed in the right region. Here, the captured image 540 and the captured image 560 may be synthesized images or images before being synthesized. The user may determine whether to store the captured images 540 and 560 illustrated in FIG. 5C, i.e., quick view images. When the captured images 540 and 560 of FIG. 5C are synthesized images, quick view images that are synthesized images may be stored as one image file in the memory card (not shown), and when the captured images 540 and 560 of FIG. 5C are images before being synthesized, the captured images 540 and 560 of FIG. 5C may be quick view images, respectively, and may be synthesized with each other according to user's election and then may be stored as one image file in the memory card (not shown). After the synthesized image is stored, as illustrated in FIG. 5D, a plurality of division frame selection menus is displayed, and a live view image 570 is displayed in the left region based on the previously-selected division frame.

Figure 6A:
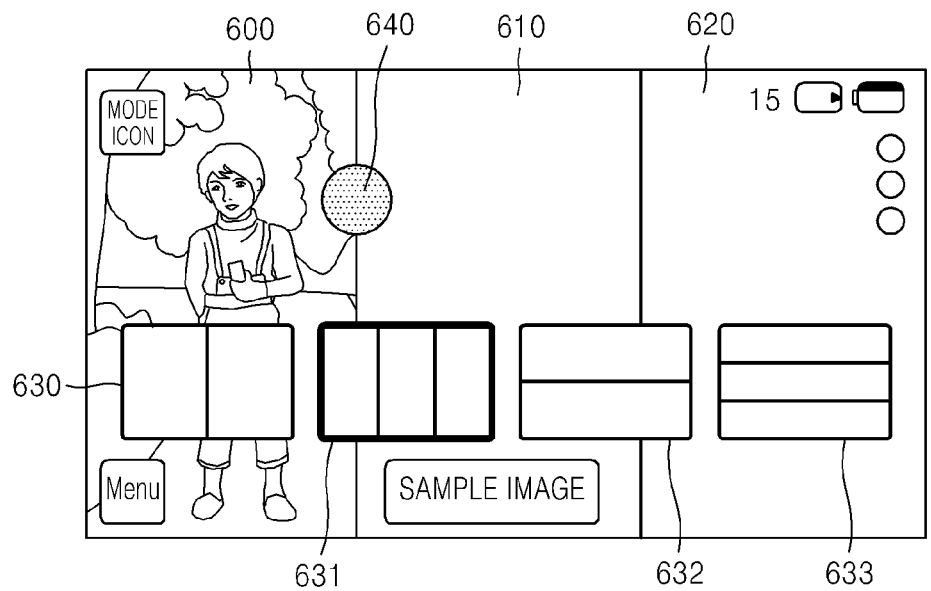
FIGS. 6A through 6C are example views for explaining a method of controlling a digital photographing apparatus, according to another embodiment of the invention.
Figure 6B:
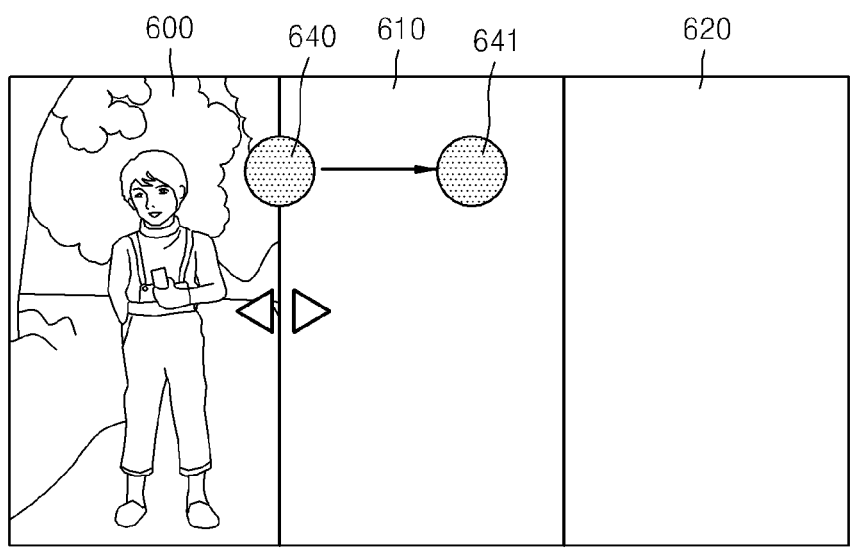
Figure 6C:
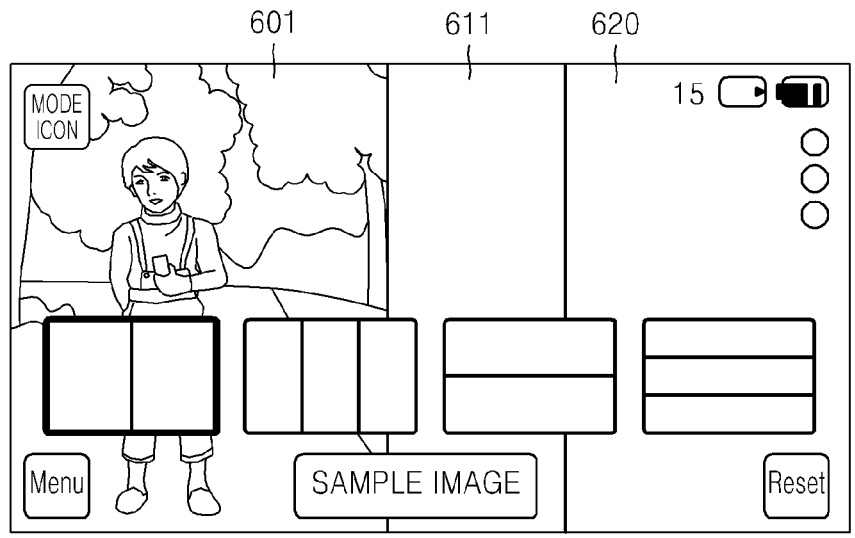

FIGS. 6A through 6C are example views for explaining a method of controlling a digital photographing apparatus, according to another embodiment of the invention.

Referring to FIG. 6A, a plurality of division frame selection menus 630 through 633 is displayed, and a vertical-3-division frame 631 is selected, and a display screen is divided based on the selected vertical-3-division frame 631. An input image 600 is displayed in a left region, and a middle region 610 and a right region 620 are black screens or in a state before photographing.

When a user touches a boundary region 640 between the left region and the middle region, as illustrated in FIG. 6B, identifiers that may adjust the size of the division frame are displayed. When the user drags from the boundary region 640 to a right region 641, as illustrated in FIG. 6C, the left region or the size of the division frame is increased, and the size of an input image 601 displayed in the left region is also increased. In this case, as illustrated in FIG. 6B, when the size of the division frame is adjusted, on screen display (OSD) icons that were displayed on the display screen disappear. Here, when the user releases touch, as illustrated in FIG. 6C, the input image 601 is displayed in the left region in the state where the size of the division frame is increased, and the OSD icons that disappeared are re-displayed and are maintained in a photographing ready state. When a reset menu illustrated in FIG. 6C is selected, a previous division frame, i.e., the size of the division frame is returned to its original state before the size of the division frame is increased.

FIGS. 7A through 7E are example views for explaining a method of controlling a digital photographing apparatus, according to another embodiment of the invention.

Figure 7A:
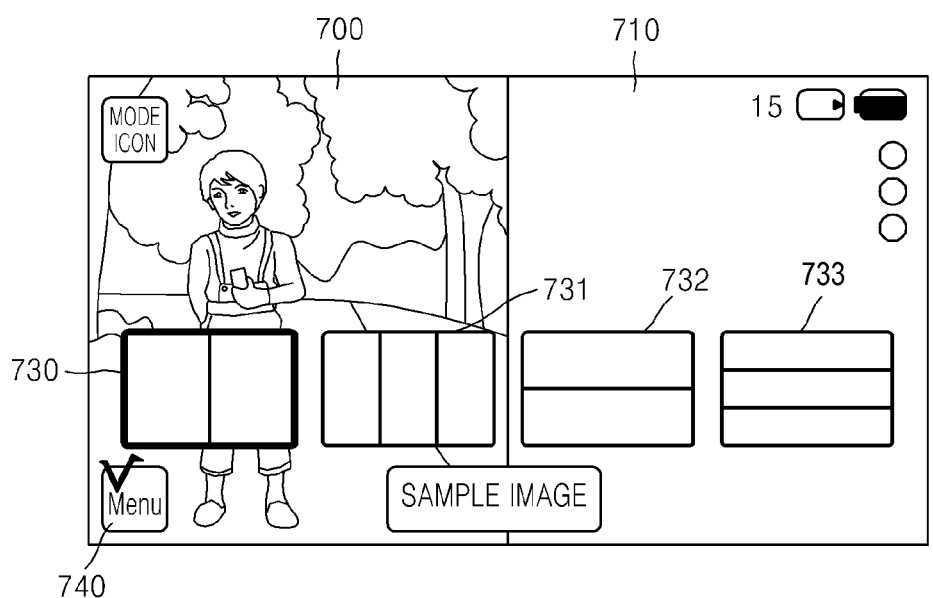
FIGS. 7A through 7E are example views for explaining a method of controlling a digital photographing apparatus, according to another embodiment of the invention.

Referring to FIG. 7A, a plurality of division frames 730 through 733 are displayed on a display screen, and a vertical-2-division frame 730 is selected from among the plurality of division frames 730 through 733. An input image 700 is displayed in a left region, and a menu is selected.

Figure 7B:
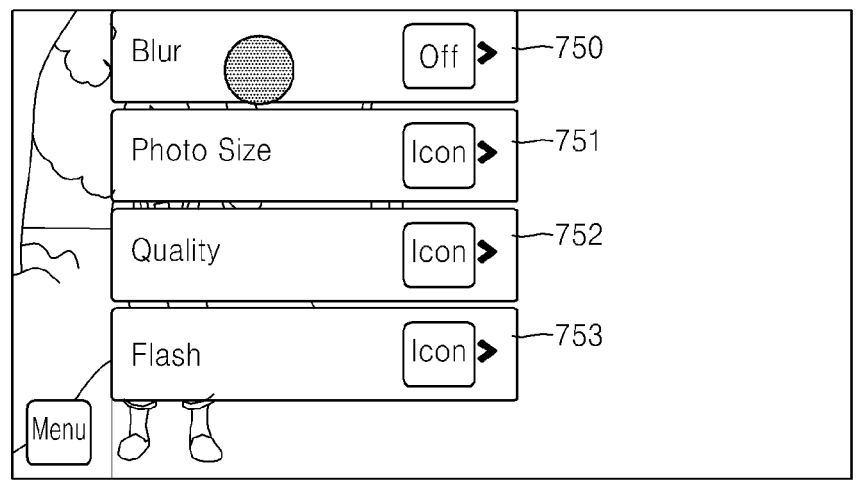

As illustrated in FIG. 7B, various photographing menus, such as blur 750, a photo size 751, quality 752, flash 753, and the like, are displayed, and the blur 750 is selected and is set from an off state to an on state.

Figure 7C:
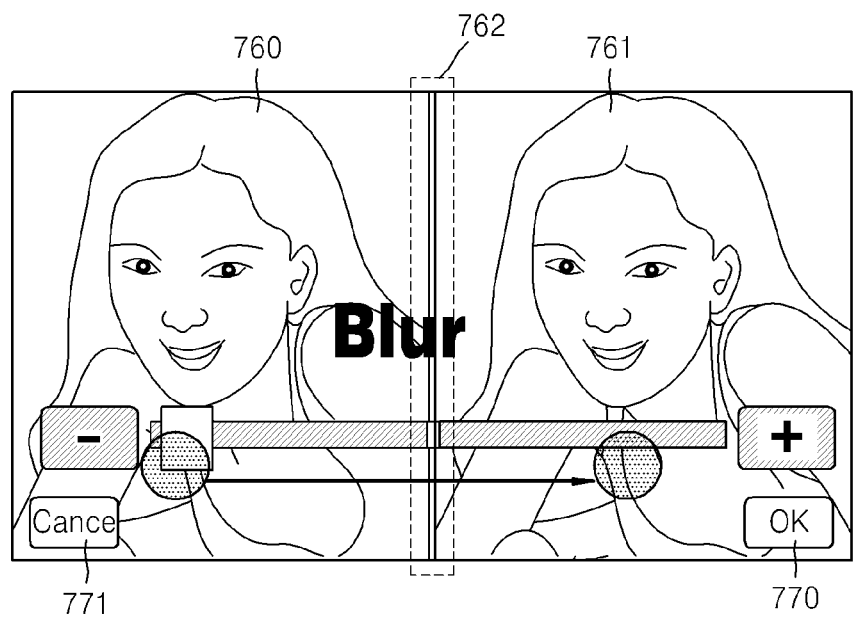
Figure 7D:
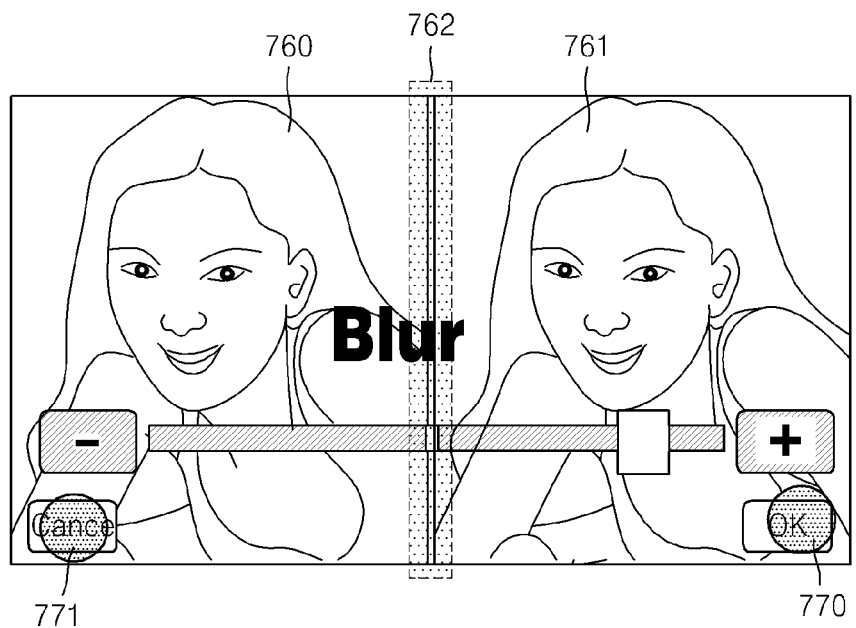
Figure 7E:
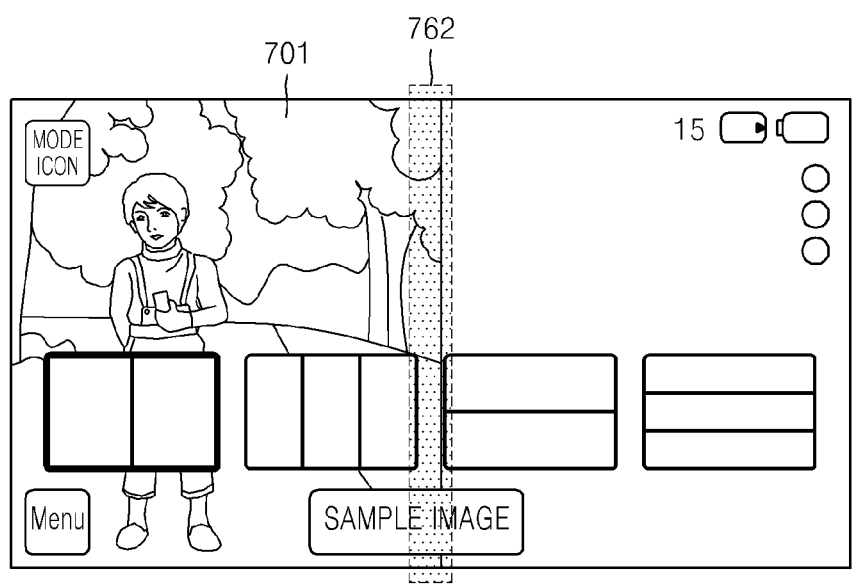

As illustrated in FIG. 7C, a menu for adjusting the intensity of blur processing with respect to a boundary region 762 between sample images 760 and 761 is displayed. If the menu for adjusting the intensity of blur processing is selected, as illustrated in FIG. 7D, the boundary region 762 is blurred. If OK is selected in FIG. 7D, then the image of FIG. 7D may be generated by the boundary region 762 of the division frame being blurred with the set intensity of blur processing, and the image of FIG. 7D may be saved. The photographing apparatus may then display the input image illustrated in FIG. 7E. If a menu Cancel is selected in FIG. 7D, then the display screen is returned to its previous state.

FIGS. 8A through 8D are example views for explaining a method of controlling a digital photographing apparatus, according to another embodiment of the invention.

Figure 8A:
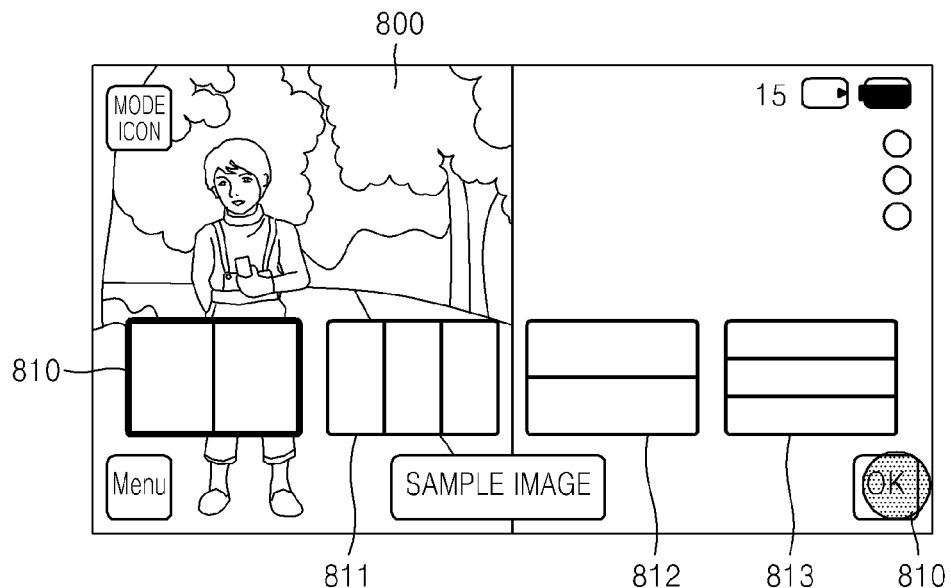
FIGS. 8A through 8D are example views for explaining a method of controlling a digital photographing apparatus, according to another embodiment of the invention.
Figure 8B:
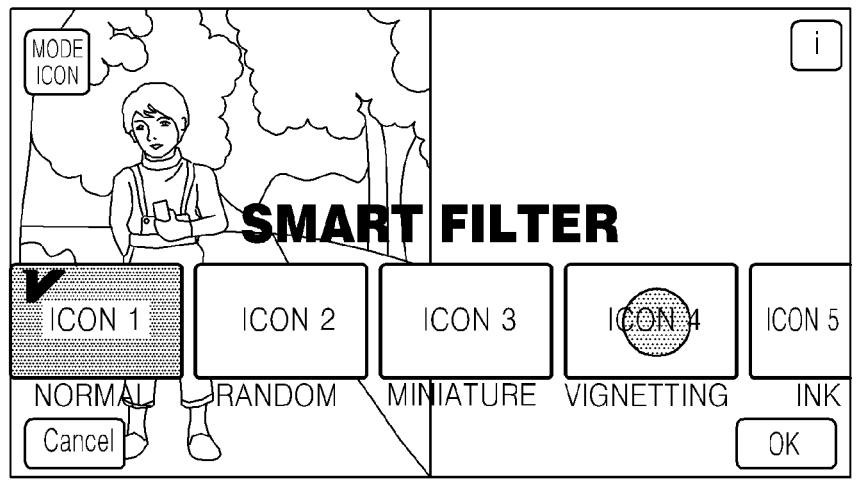
Figure 8C:
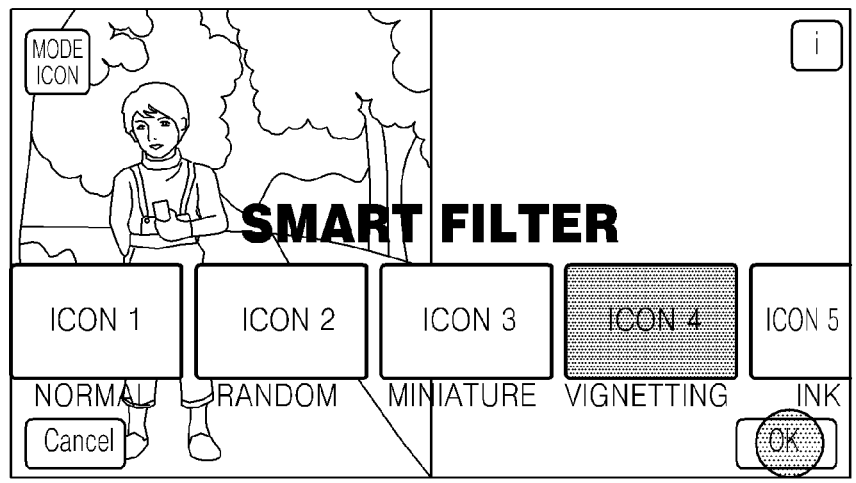
Figure 8D:
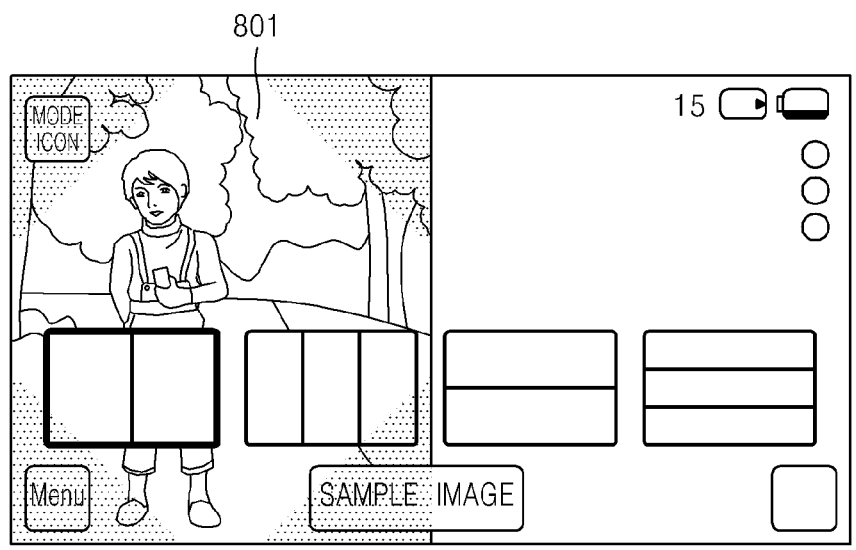

Referring to FIG. 8A, a plurality of division frames 810 through 813 is displayed on a display screen, and a vertical-2-division frame 810 is selected from among the plurality of division frames 810 through 813. An input image 800 is displayed in a left region, and a smart filter menu 810 is selected. As illustrated in FIG. 8B, a plurality of image processing effects, i.e., icons 1 through 5, such as normal, random, miniature, vignetting, ink, and the like, are displayed. The normal icon is grayed indicating that the input image 800 is currently normal with no effect. When icon 4 is selected and a menu OK is selected, as illustrated in FIG. 8C, the vignetting effect is applied to the input image 800 to generate input image 801, which is displayed in FIG. 8D.

Figure 9A:
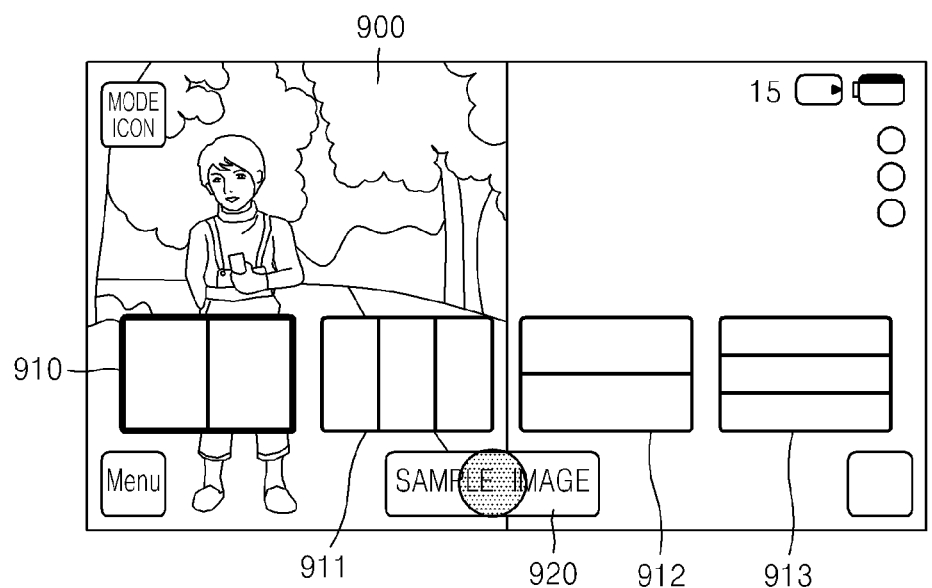
FIGS. 9A through 9C are example views for explaining a method of controlling a digital photographing apparatus, according to another embodiment of the invention.
Figure 9B:
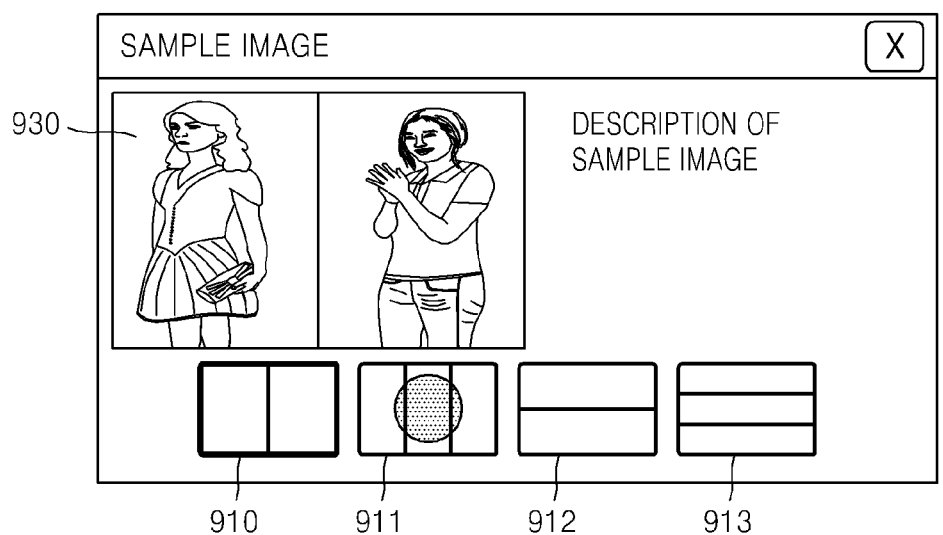
Figure 9C:
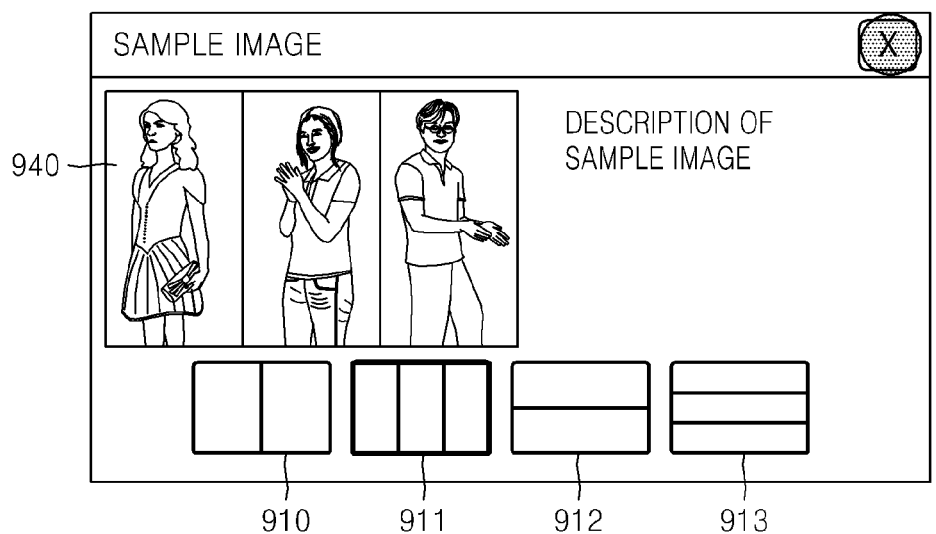

FIGS. 9A through 9C are example views for explaining a method of controlling a digital photographing apparatus, according to another embodiment of the invention.

Referring to FIG. 9A, a plurality of division frames 910 through 913 are displayed on a display screen, and a vertical-2-division frame 910 is selected from among the plurality of division frames 910 through 913. An input image 900 is displayed in a left region, and a sample image menu 920 is selected. As illustrated in FIG. 9B, a sample image 930 is displayed based on the selected vertical-2-division frame 910, and a description of the sample image 930 is displayed. As illustrated in FIG. 9B, when a division frame 911 is selected, a sample image 940 based on the division frame 911 is displayed, as illustrated in FIG. 9C.

FIGS. 10 through 13 are example views of synthesized images, which are captured using each of the methods illustrated in FIGS. 3 through FIGS. 9A through 9C.

Figure 10:
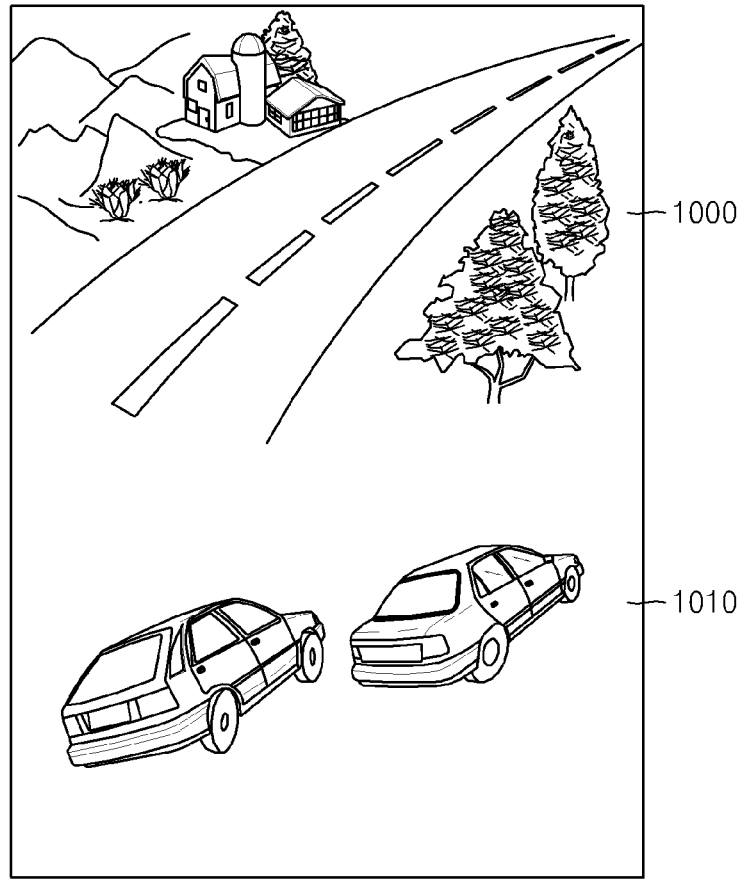
FIGS. 10 through 13 are example views of synthesized images, which are captured using each of the methods illustrated in FIG. 3 through FIGS. 9A through 9C.
Figure 11:
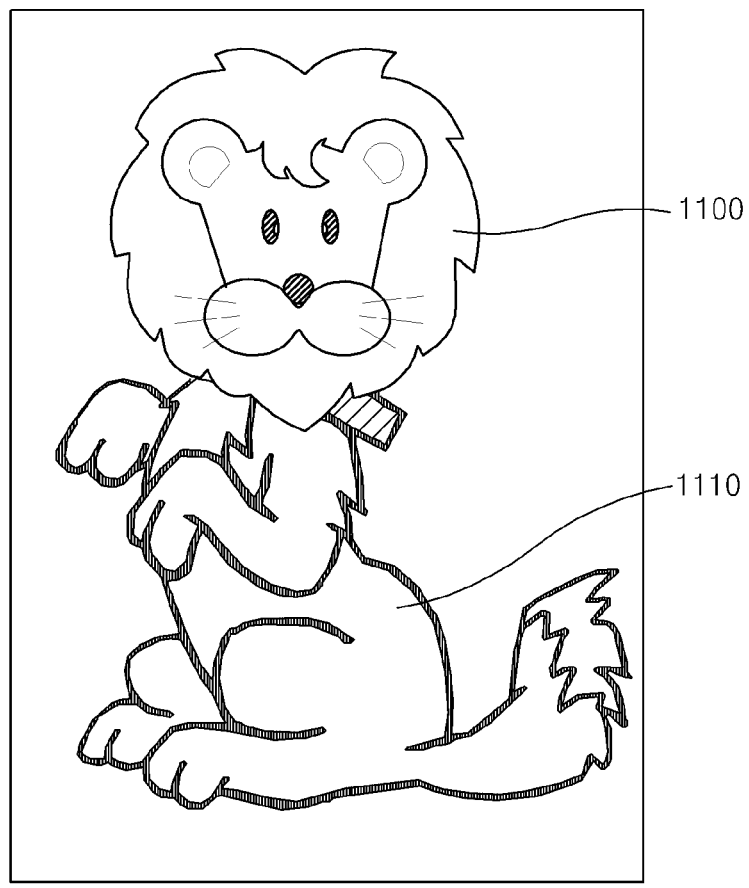
Figure 12:
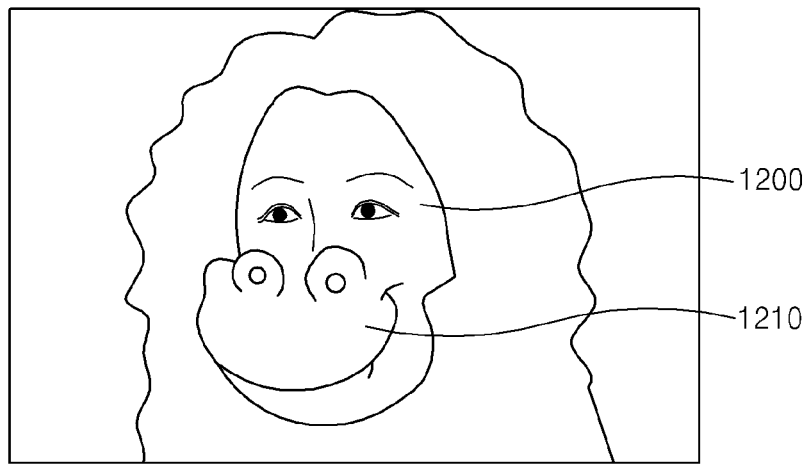
Figure 13:
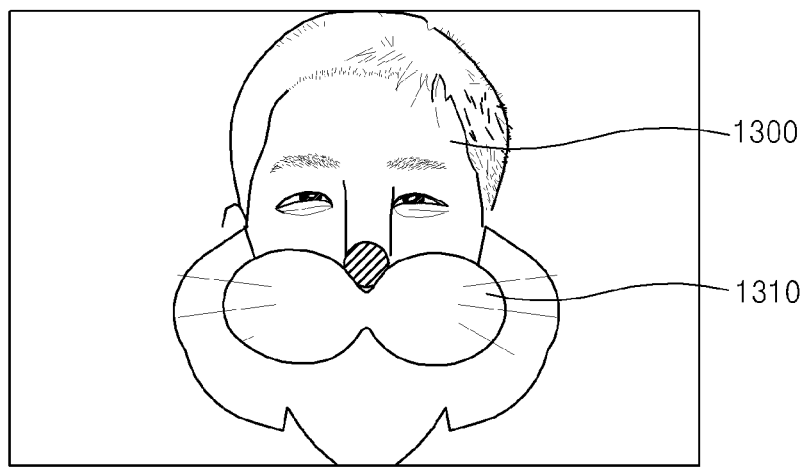

FIG. 10 illustrates an image that is obtained by synthesizing a first captured image 1000 and a second captured image 1010 with each other, and FIG. 11 illustrates an image that is obtained by synthesizing a first captured image 1100 and a second captured image 1110 with each other, and FIG. 12 illustrates an image that is obtained by synthesizing a first captured image 1200 and a second captured image 1210, and FIG. 13 illustrates an image that is obtained by synthesizing a first captured image 1300 and a second captured image 1310.

As described above, in a digital photographing apparatus and a method of controlling the same according to the one or more embodiments of the invention, multi-division photographing is performed to allow a user to freely capture images and to synthesize several images with one image and to cause a selected effect so that improved experience and satisfaction may be provided to the user.

One or more embodiments of the invention provide a digital photographing apparatus that may provide improved experience and satisfaction to a user by performing multi-division photographing to allow the user to freely capture images, to synthesize several images with one image, and to cause an arbitrary effect, and a method of controlling the digital photographing apparatus.

In some embodiments, the methods described herein may be embodied in a computer readable medium that comprises computer code that when executed by a computer causes the computer to perform the methods described herein. The computer readable medium may be non-transitory.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the specification are merely used to describe particular embodiments, and are not intended to limit the invention. An expression used in the singular encompasses the expression of the plural, unless it has a clearly different meaning in the context. In the specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method of controlling a digital photographing apparatus, the method comprising:
providing a menu of a plurality of division frames, each division frame indicating the number of regions into which a display screen is to be divided;
setting a division frame selected from the plurality of division frames;
displaying a first input image in a first region of the set division frame;
displaying in the first region the first input image captured according to a first photographing signal;
displaying a second input image in a second region of the set division frame; and displaying the second input image captured according to a second photographing signal in the second region.

2. The method of claim 1, further comprising: synthesizing the first captured input image and the second captured input image with each other and displaying the synthesized image.

3. The method of claim 1, further comprising storing the synthesized image obtained by synthesizing the first captured input image and the second captured input image as one image file.

4. The method of claim 1, further comprising adjusting a size of the set division frame.

5. The method of claim 1, further comprising blur processing a boundary region of the set division frame.

6. The method of claim 1, further comprising:
providing a selection menu for blur processing a boundary region of the set division frame;
displaying sample images in the first region and the second region, respectively, according to selection of the blur processing;
blur processing the boundary region based on the displayed sample images; and
blur processing a boundary region between the first displayed input image or the second displayed input image.

7. The method of claim 5, further comprising determining an intensity of the blur processing.

8. The method of claim 1, further comprising displaying a selection menu comprising a plurality of image processing effects on the first displayed input image and the second displayed input image.

9. The menu of claim 8, further comprising displaying the first input image or the second input image to which an image processing effect selected using the selection menu is applied.

10. The method of claim 1, further comprising:
displaying a sample image that is synthesized using the set division frame.

11. The method of claim 10, wherein information regarding the synthesized sample image is displayed together with the synthesized sample image.

12. A method of controlling a digital photographing apparatus, the method comprising:
providing a menu of a plurality of division frames, each division frame indicating the number of regions into which a display screen is to be divided;
dividing a display screen according to a division frame selected from among the plurality of division frames;
displaying a first input image in a first region of the division frame and capturing the first input image according to a first photographing signal;
displaying the first captured input image in the first region;
displaying a second image in a second of the division frame and capturing the second input image according to a second photographing signal;
displaying the second captured input image in the second region; and
storing a synthesized image obtained by synthesizing the first captured input image and the second captured input image.

13. A digital photographing apparatus comprising:
a division frame setting unit configured to:
provide a menu having a plurality of division frames, each division frame indicating the number of regions into which a display screen is to be divided; and
set a division frame selected from the plurality of division frames;
a photographing control unit configured to control photographing of an input image according to a photographing signal; and
a display control unit configured to: display the input image and an image obtained by capturing the input image on the display screen, display a first input image in a first region of the set division frame, and configured to display the first input image captured according to a first photographing signal in the first region, display a second input image in a second region of the set division frame, and display the second input image captured according to a second photographing signal in the second region.

14. The digital photographing apparatus of claim 13, further comprising an image synthesizing unit configured to synthesize the first captured input image and the second captured input image, and wherein the display control unit is further configured to display the synthesized image.

15. The digital photographing apparatus of claim 13, wherein the division frame setting unit is configured to adjust a size of the set division frame.

16. The digital photographing apparatus of claim 13, further comprising a blur processing unit configured to blur process a boundary region of the set division frame.

17. The digital photographing apparatus of claim 13, further comprising a storage control unit configured to store the synthesized image obtained by synthesizing the first captured input image and the second captured input image together as one image file.

18. The digital photographing apparatus of claim 13, further comprising an effect applying unit configured to apply a selected image processing effect, wherein the image processing effect is selected from a menu of a plurality of image processing effects displayed on the first displayed input image or the second displayed input image.

* * * * *